United States Patent
Bailey et al.

(10) Patent No.: US 12,235,917 B2
(45) Date of Patent: *Feb. 25, 2025

(54) METHODS AND SYSTEMS FOR GENERATING CUSTOM CONTENT USING UNIVERSAL DEEP LINKING ACROSS WEB AND MOBILE APPLICATIONS

(71) Applicant: Capital One Services, LLC, McLean, VA (US)

(72) Inventors: Kristina Bailey, Leesburg, VA (US); Andrew Rosenbaum, Potomac, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,693

(22) Filed: May 22, 2023

(65) Prior Publication Data
US 2023/0289393 A1  Sep. 14, 2023

Related U.S. Application Data

(63) Continuation of application No. 17/147,876, filed on Jan. 13, 2021, now Pat. No. 11,704,373, which is a continuation of application No. 16/821,720, filed on Mar. 17, 2020, now Pat. No. 10,922,372.

(51) Int. Cl.
*G06F 16/00* (2019.01)
*G06F 16/9535* (2019.01)
*G06F 16/955* (2019.01)
*G06F 16/957* (2019.01)

(52) U.S. Cl.
CPC ...... *G06F 16/9535* (2019.01); *G06F 16/9558* (2019.01); *G06F 16/9577* (2019.01)

(58) Field of Classification Search
None
See application file for complete search history.

(56) References Cited

U.S. PATENT DOCUMENTS

| | | |
|---|---|---|
| 11,106,754 B1 * | 8/2021 | Bailey ................. G06F 21/6218 |
| 2013/0066976 A1 * | 3/2013 | Massey .................. H04W 4/50 709/206 |

* cited by examiner

*Primary Examiner* — Tuankhanh D Phan
(74) *Attorney, Agent, or Firm* — Foley & Lardner LLP

(57) ABSTRACT

The methods and systems described herein improve upon existing deep linking concepts, by creating links directed to a feature registry which may then serve the user's need of selecting and accessing a given feature. The feature registry may provide customized features that may populate a feature template in a user interface (e.g., of a feature registry application) on a local device. This population may occur in both a real-time (e.g., based on a continuously updated machine learning model) and modular fashion. For example, the system and methods may generate customized content on a website or mobile application through a hyperlink by filtering available features on a feature registry based on the identity of the user, the information from the user profile, and the description of the hyperlink content.

20 Claims, 9 Drawing Sheets

METHODS AND SYSTEMS FOR GENERATING CUSTOM CONTENT USING UNIVERSAL DEEP LINKING ACROSS WEB AND MOBILE APPLICATIONS

CROSS-REFERENCE TO RELATED APPLICATIONS

This application is a continuation of U.S. patent application Ser. No. 17/147,876, filed Jan. 13, 2021, which is a continuation of U.S. patent application Ser. No. 16/821,720, filed Mar. 17, 2020, the content of which applications is incorporated herein in its entirety by reference.

FIELD OF THE INVENTION

The invention relates to generating custom content using universal deep linking across web and mobile applications.

BACKGROUND

In conventional systems, users are able to access content from a plethora of sources and through a plethora of platforms. For example, it is not uncommon for a user of a web application (e.g., run in a web browser) to request content from a first webpage and to be redirected to a second webpage. Likewise, it is not uncommon for a user of a native application (e.g., a software program run on a particular platform and/or device for which it was developed) to request content from an interface in a native application and to be redirected to a webpage or other native application. Finally, it is not uncommon for a user of a web application to request content from a webpage and to be redirected to a native application. In many ways, redirecting a user in these manners improves the user experience as the user is seamlessly transferred. However, as applications (both web applications and native applications) increase in complexity and are further developed for specific types of devices (e.g., desktop, mobile, etc.), redirecting users in a seamless manner becomes increasingly more difficult.

SUMMARY

Methods and systems are described herein for addressing the aforementioned problems, specifically by improving the user experience of users accessing applications through seamlessly providing additional features and functions. For example, the methods and systems provide improvements to deep linking. Deep linking is the use of a hyperlink that links to a specific, generally searchable or indexed, piece of web content on a website, rather than the website's home page. In deep linking, a universal resource locator ("URL") contains all the information needed to point to a particular item. However, in conventional systems, deep linking has several drawbacks. First, a specific deep link must be manually created for each URL. Thus, as the location of the linked-to content changes, as the content itself is changed over time, and as the structures of native applications are not standardized, the creation and modification of URL's featuring deep links (particularly as the number of potential URLs are exponentially increasing), is a labor-intensive and difficult task.

Moreover, as users increasingly expect customization in their experiences, URLs must increasingly grow more complex to support this customization. This increasing complexity led to the development of uniform resource identifier ("URI") schemes. However, such approaches, in addition to lacking standardization, have been blocked by certain operating systems and leave systems implementing these schemes vulnerable to further operating system updates and modifications. Furthermore, such schemes may need additional layers of complexity in order to handle requests from web or native applications for an un-downloaded native application. The aforementioned complexity is only exacerbated if the URLs and URI schemes are developed to depend on contextual information (e.g., information about where a user wants to go, what function needs to be activated, where a link was selected, who was the original source of a link, etc.). Finally, if URLs or URI schemes are not continuously updated and authenticated, these URLs and URI schemes may direct users to inactive locations and/or features to which the user does not have access.

The methods and systems described herein improve upon existing deep linking concepts, by creating links directed to a feature registry which may then serve the user's need of selecting and accessing a given feature. As opposed to the drawbacks discussed above, the feature registry is easily updated and modified, reduces the complexity of a URL or URI scheme, and/or can automatically redirect users from inactive locations and/or features to which the user does not have access. Moreover, the feature registry may provide customized features that may populate a feature template in a user interface (e.g., of a feature registry application) on a local device. This population may occur in both a real-time (e.g., based on a continuously updated machine learning model) and modular fashion, in which features are selected based not only on information about the user and the hyperlink selected, but also on the availability of features, a user's determined access to those features, and/or other features already being accessed by the user (e.g., in the feature registry application).

The methods and systems described herein also provide an environment in which data (e.g., analytical data received from third-parties) may be normalized prior to use and in which users may be authenticated prior to transmitting sensitive information in a request to the feature registry. Accordingly, the transmitted data is both of higher quality (e.g., easier to compare for analytics and user profiling purposes) as well as more secure.

In one aspect, system and methods are described herein for generating customized content on a website or mobile application through a hyperlink. For example, the system may receive, at a server, a feature registry request from a feature registry application on a local device, wherein the feature registry request is generated by the local device in response to a user selection of hyperlinked content associated with the feature registry application. In response to receiving the feature registry request, the system may determine, at the server, whether a feature is available on a feature registry. In response to determining that a feature is available, the system may determine, at the server, whether a user associated with the user selection is authorized to access the feature. In response to determining that the user is authorized to access the feature, the system may determine, at the server, a location in memory of the feature in a format suitable for the local device. The system may retrieve the feature from the location in memory and populate a feature template on the local device with the feature.

In one aspect, system and methods are described herein for generating customized content on a website or mobile application through a hyperlink. For example, the system may receive, at a server, a feature registry request from a feature registry application on a local device, wherein the feature registry request is generated by the local device in response to a user selection of hyperlinked content associated with the feature registry application. In response to receiving the feature registry request, the system may retrieve an identity of a user associated with the user selection, retrieve information in a user profile associated with the user, and retrieve a description of hyperlink content. The system may then filter available features on a feature registry based on the identity of the user, the information from the user profile, and the description of the hyperlink content. The system may then select a customized feature for the user from the filtered available features and populate a feature template on a local device with the customized feature.

In one aspect, system and methods are described herein for hyperlinking to user-specific content on a website or mobile application. For example, the system may initiate, using control circuitry, a user interface application on a local device. In response to initiating the user interface application, the system may authenticate, using the control circuitry, an identity of a user of the local device. In response to authenticating the identity of the user, the system may retrieve, using the control circuitry, a user profile associated with the user. The system may generate for display, using the control circuitry, the hyperlinked content in the user interface application, wherein the hyperlinked content is associated with a feature registry application. The system may receive, using the control circuitry, a user selection of the hyperlinked content. In response to the user selection, the system may access, using the control circuitry, the feature registry application, wherein the feature registry application transmits a feature registry request to a feature registry, and wherein the feature registry request includes the identity of the user, information from the user profile, and a description of the hyperlinked content. The system may receive from the feature registry a feature for the user based on the feature registry request. The system may generate for display, on the local device, the feature in the user interface application.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
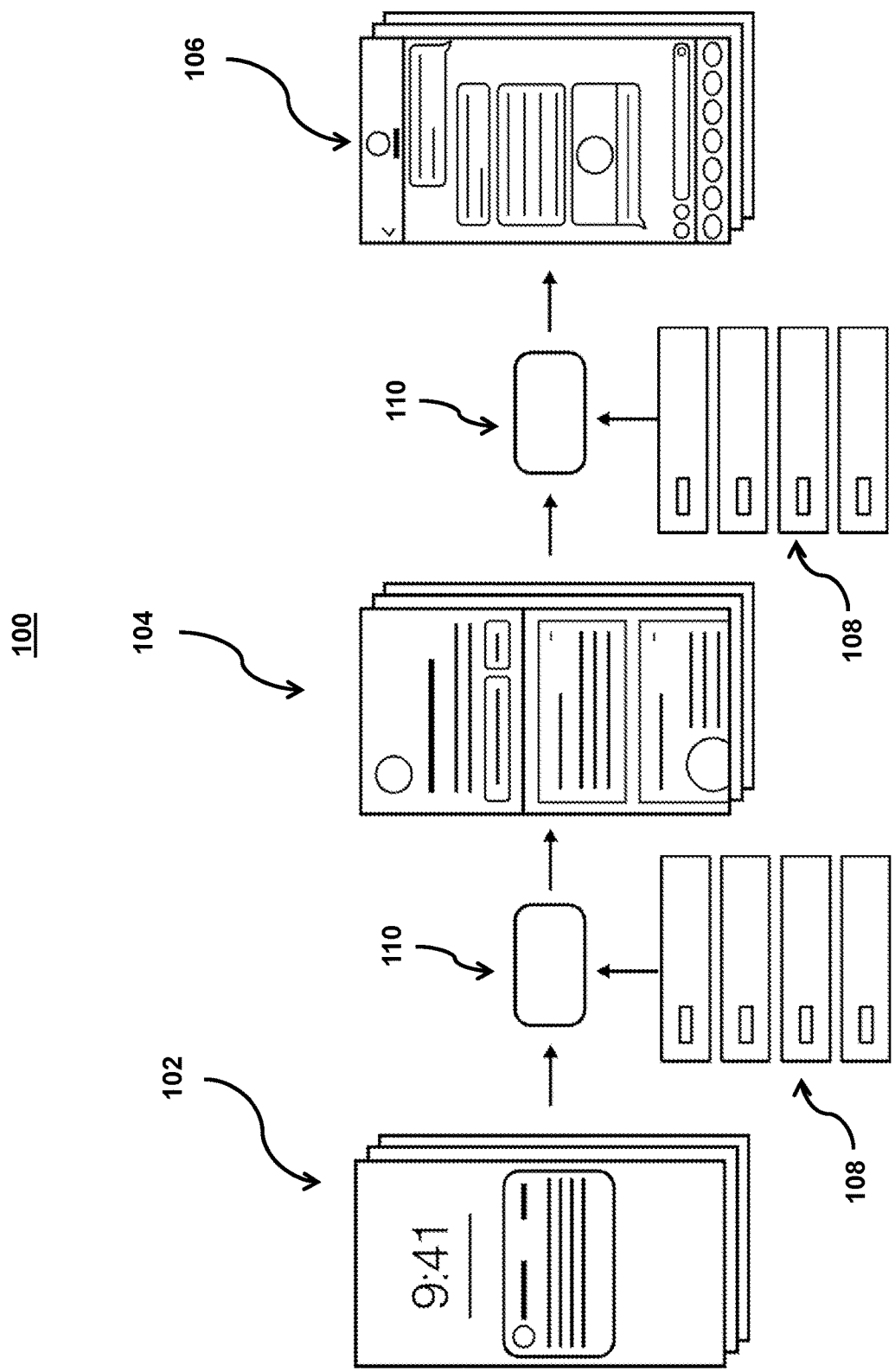
FIG. 1 shows a diagram of an illustrative user interface applying a universal deep linking system, in accordance with one or more embodiments.

FIG. 1 shows a diagram of an illustrative user interface applying a universal deep linking system, in accordance with one or more embodiments. For example, FIG. 1 illustrates a progression of features present in a user interface of an application. It should be noted that while the application in diagram 100 is illustrated as a native application as would be presented on a mobile device, embodiments of diagram 100 may apply to other applications and applications types. For example, diagram 100 shows user interface 102. User interface may include a first universal deep link. For example, the universal deep link may be based on a deep link application programming interface ("API"). In such cases, internal or external content providers (e.g., user wishing to place a deep link on their website, in their application, etc.) may create a universal deep link based on the deep link API (e.g., as described further in relation to FIG. 4 below). The universal deep link may include a feature reference that describes a desired feature and/or function.

In some embodiments, user interface 102 may include a first set of features. As described herein, a feature may include any option and functional capability provided to a user by software and/or hardware. For example, a feature may include a distinctive attribute or aspect (e.g., related to (e.g., performance, portability, and/or functionality) of the software and/or hardware. For example, in some embodiments, a feature may be an available function of a program, operating system, and/or device. In some embodiments, the feature may be provided as part of an application and/or may be provided as a plug-in, applet, browser extension, and/or other software component for an existing application. For example, the feature may be part of an application and/or other program that may be toggled on or off. In another example, the feature may be a software component that may be added and/or removed from an application.

Each feature may display particular information and/or information of a particular type. Alternatively or additionally, each feature may provide a given function. This function may be a locally performed function (e.g., a function performed on a local device) or this function may be a remotely-executed function. In some embodiments, a feature may represent a link to additional information and/or other features, which may be accessed and/or available locally or remotely. In some embodiments, the feature may be represented by textual and/or graphical information.

The system may include a feature reference (e.g., metadata or other information that describes the feature). For example, the feature reference may include information about the purpose, functions, origin, system requirements (including required formats and/or capabilities), author, recommended use and/or user, related features (including features designated as complimentary, redundant, and/or incompatible). The feature reference may include a description that may be expressed in a human and/or computer readable language. The feature reference may also include a reference or pointer to user profile information that may be relevant to the selection and/or use of the feature. The system may retrieve this information and/or compare it to the description in order to select and/or use the feature. For example, the description may indicate that the feature uses a particular format and/or displays data in a particular language. The system may retrieve information from a user profile that indicates a device format associated with the user and/or a language setting associated with the user. The system may then determine whether or not the retrieve information corresponds to the description.

The system may access a user profile. The user profile may be stored locally on a user device and/or remote (e.g., at server 108). The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a feature towards a user and/or customize features for a user.

For example, as shown in diagram 100, user interface 102 may include a first feature. The first feature may have been pre-fetched by the system prior to a user activating an application (e.g., a feature registry application) that generates the feature for display. The system may pre-fetch this information based on information in the user profile (e.g., a user preference or setting), a predetermined or standard feature selection (e.g., by the application), a previously selected feature (e.g., a feature that was present the last time the application was used), and/or a real-time determination of feature registry 110. For example, feature registry 110 may continuously, and in real-time, update information about a user. The system may continuously pre-fetch this information and/or may push this information to a local user device and/or edge server for immediate use if an application is activated. Accordingly, the system may minimize delays attributed to populating feature templates and/or providing features and information for features.

It should be noted that as referred to herein, one or more of the components of the system or feature registry may be referred to collectively as the "system" and/or the "feature registry". For example, in some embodiments, server 108 and feature registry 110 may be referred to collectively as the "system" and/or the "feature registry".

For example, the system may select a feature based on user insights and the features (e.g., related metadata) may be streamed to the mobile application prior to the user accessing the mobile application (e.g., at least while the user is logged out) such that the features are presented in the user's landing page (or other mobile app templated page) when the user logs into or otherwise accesses the mobile application. In another example, an application feature may be removed or replaced with an alternative feature based on the current availability status of the feature (e.g., if a feature is currently down, then a similar feature is generated for display). In some embodiments, the feature and the alternative feature are streamed as an associated pair/set to the mobile application, and, if the feature is detected to be down, the mobile app will show the alternative feature in its place.

In diagram 100, user interface 102 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, low resolution preview, cropped section, or magnified section of the accessible content). Alternatively the link may be an anchor link and/or fat link. In some embodiments, the link may be located within a first feature and/or the link may comprise the first feature. In some embodiments, the first link may comprise a push notification. For example, the push notification may have been generated in real-time based on a machine learning model (e.g., machine learning model 202 (FIG. 2)).

In response to a user selection of a link in user interface 102, the system may transmit a feature registry request to feature registry 110. For example, feature registry 110 may comprise a centralized catalog where the system can provide registered applications and/or add or configure features for toggling and throttling. Feature registry 110 may support meta-data (e.g., descriptions of features), features that are being throttled and/or a level of throttling, remote/centralized configuration for the features, testing support and sandboxes for features, scheduled rollouts for features, and application versions for features. For example, the system may allow application providers to deliver faster, and with confidence, applications and updates to the applications, while providing the ability to toggle and throttle features on and off at the user level. For example, feature registry 110 may allow the system to filter through one or more user groups (and data about user groups and profiles), one or more applications (and application versions), plugin features (and versions of features). Feature registry 110 may further configure the feature and generate a feature for populating a feature template.

The feature registry request may comprise an API request (or call) from one application (e.g., a feature registry application implemented on a local device) to an application on a server (e.g., a server implementing feature registry 110). The feature registry request may include one or more types of information that may be used by the feature registry to respond to the feature registry request (e.g., data changes and insights/user actions). For example, the feature registry request may include information on a function and/or feature that a user is requesting, may include information on the user and/or user device, and/or may include information about other features currently running on the application. For example, the feature registry may use the feature registry request to select a feature with which to respond to the feature registry request.

In some embodiments, the feature registry may be configured to receive information (e.g., feature references, user profile information, etc.) in a format standardized by a feature registry toolbox. For example, the feature registry toolbox may include an abstraction layer that provides consistent interfaces for feature development (e.g., logging, analytics, network, security). The feature registry toolbox may include a set of platform capabilities that dictate where a third-party may put code, how the code should be structured, and how the code gets surfaced in the application. In some embodiments, the feature registry toolbox includes CI/CD enforcement. By doing so, the system may build and test small, modular pieces of the application related to an individual change or toggling of a feature made. In some embodiments, the feature registry toolbox may provide features and functions related to Architectural pattern, routing, dependency injection, event/data model, shipping, clickstream data, and logging.

For example, in some embodiments, the feature registry may create a library to simplify communicating with the API and managing user and session data. The system may therefore support multiple data providers and federated routing development, including better management of application/sub-application routing, consistent capture of usage data about our users to standardize data elements for features, generate consistent and predictable data, and generate a baseline of data for features. Moreover, datasets from different third-party analytics platforms may be prepared such that all of those different third-party analytics data will generate the same results from the same set of data. For example, a third-party provider may have a field called "timeStamp", the feature registry may have a similar field called "dtStamp". Using the feature registry toolbox to normalize these types of data, the system will map "dtStamp" value to the "timeStamp" field.

In some embodiments, the system may use a machine learning model (e.g., model 202 as discussed below in relation to FIG. 2) in order to respond to the request. For example, the system may receive the request and access additional information server 108, which may include information on available features and/or user profile information. For example, while the feature registry request includes an identity of the user, information from a user profile, and a description of the hyperlinked content, the feature registry may supplement this information with additional information about the user from server 108. In some embodiments, the system may link a user account on feature registry 110 to an identify of the user in the request. The system may then supplement the request with additional information on the user from server 108. Additionally or alternatively, the feature registry 110 may retrieve additional information on one or more available features (e.g., descriptions of available features, statuses on the availability of the features, etc.) from server 108 when responding to the request. For example, feature registry 110 may use data changes and insights, user actions, and feature priorities included in the request to select, arrange, and/or assemble features for a response to the request.

As shown in diagram 100, the system may respond to the feature registry request through a feature registry response (e.g., a response to the API call comprising the feature registry request). The feature registry response may comprise one or more features. The system may further populate user interface 104 with the one or more features. For example, user interface 104 may present a feature template comprising one or more feature cells. The feature template may be based on the application and/or application type (e.g., web application, native application, mobile application, etc.). The feature template may additionally be updated and/or modified by the feature registry in response to the feature registry response. The updates and/or modification may include functional and/or visual changes (e.g., updated skins, fonts, etc.). The feature template may further include one or more feature cells. The feature cells may comprise a portion of the display screen of user interface 104, in which a feature may be populated. The system may populate the feature cells with one or more features based on the response.

As shown in diagram 100, further interactions with user interface 104 and/or the features displayed therein may cause the system to generate a second feature registry request. The second feature registry request is then transmitted to feature registry 110. At feature registry 110, the system once again interprets the feature registry request (e.g., as supplemented by information in server 108) and response to the request. The system then generates user interface 106 with features populated therein based on the response to the feature registry request. It should be noted that in addition to select feature to populate user interface 106, the system may also use the feature registry requests (and/or information included therein) to power features presented in user interface 106. For example, the system may power a feature (e.g., voice processing and real=time question and answer prediction based on user's actions) through the user of a machine learning model (e.g., machine learning model 202 (FIG. 2)).

Figure 2:
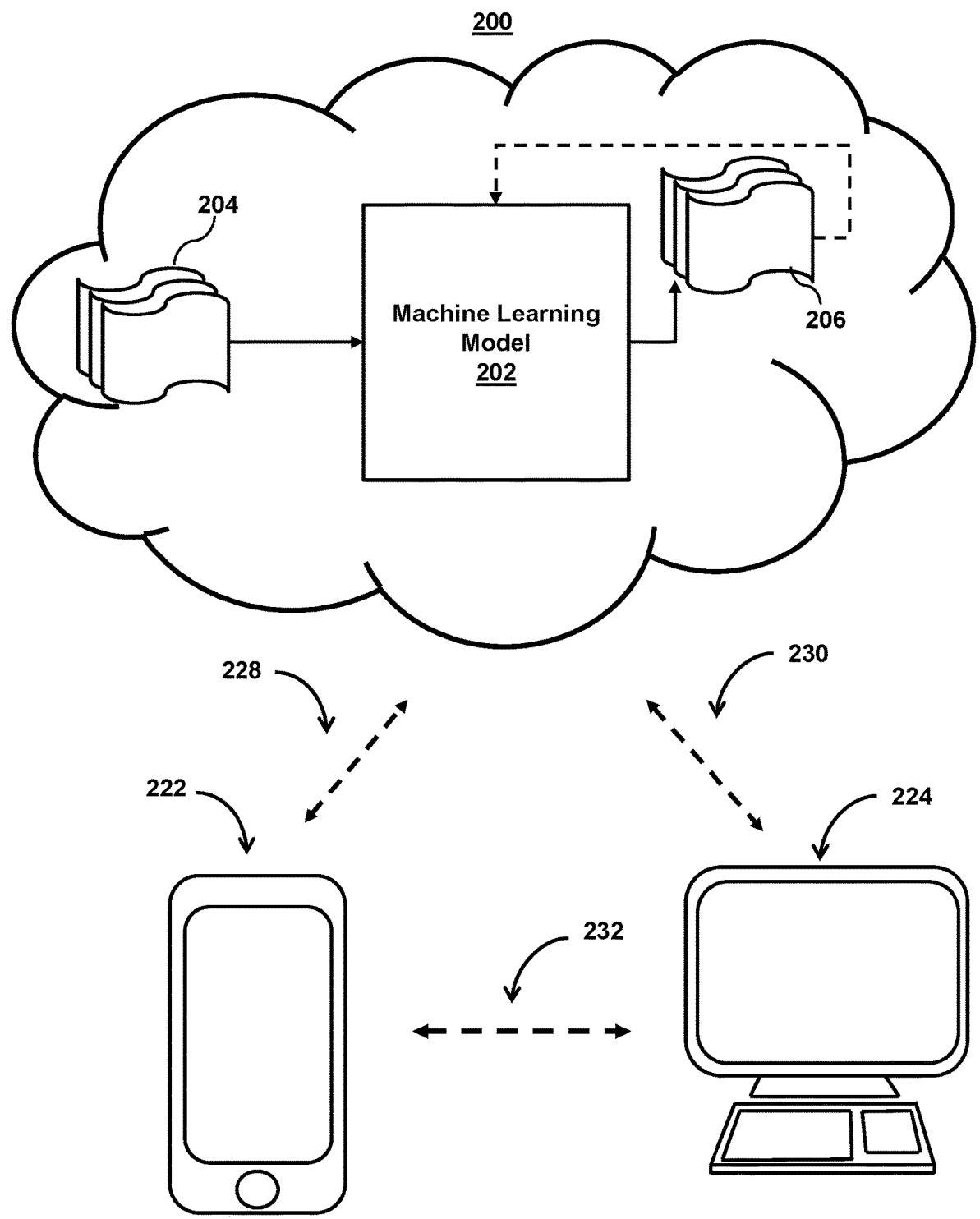
FIG. 2 shows an illustrative system for implementing machine learning in a universal deep linking system, in accordance with one or more embodiments.

FIG. 2 shows an illustrative system for implementing machine learning in a universal deep linking system, in accordance with one or more embodiments. As shown in FIG. 2, system 200 may include user device 222, user device 224, and/or other components. Each user device may include any type of mobile terminal, fixed terminal, or other device. For example, each of these devices may comprise one or more of the devices shown in FIG. 1. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 102 (FIG. 1)).

By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222 and user device 224, or accessible by communication paths 228 and 230, respectively. It should be noted that, although some embodiments are described herein with respect to machine learning models, other prediction models (e.g., statistical models or other analytics models)

may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. The inputs may include multiple data sets such as a training data set and a test data set. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202). Machine learning model 202 may be used by a feature registry (e.g., feature registry 110 (FIG. 1)) to respond to a feature registry request and/or power a feature that is generated for display.

Figure 3:
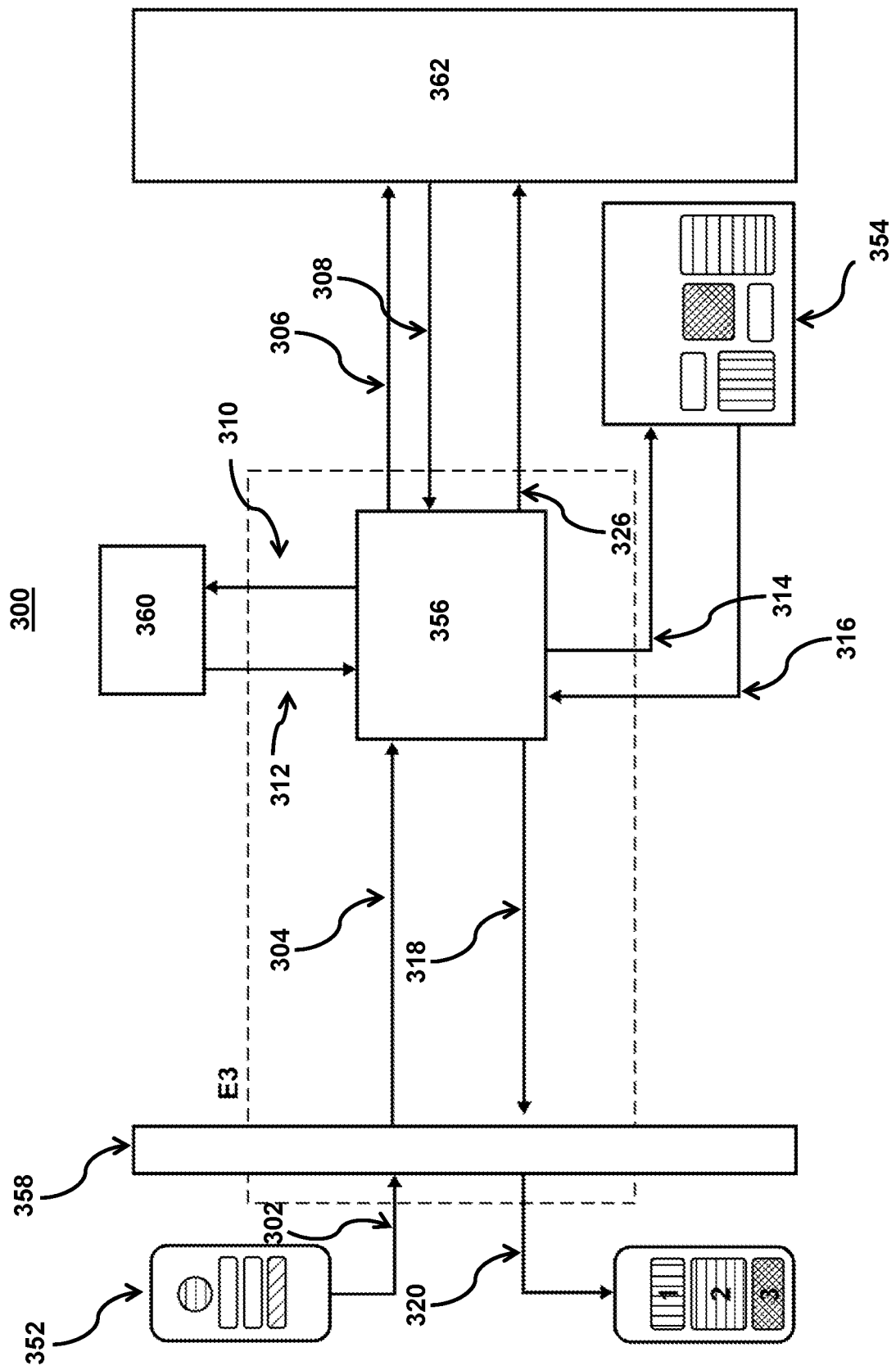
FIG. 3 shows an illustrative system for implementing a feature registry in a universal deep linking system, in accordance with one or more embodiments.

FIG. 3 shows an illustrative system for implementing a feature registry in a universal deep linking system, in accordance with one or more embodiments. For example, the system may use a machine learning model (e.g., machine learning model 202 (FIG. 2)) as an intelligent engine that orchestrates a consistent user experience to deliver an optimal feature for a target audience and at a particular moment using data changes and user insights, user actions, and feature priority to assemble the right features. For example, FIG. 3 shows a progression of steps through which system 300 selects a feature.

At point 302, a user logs onto or otherwise signs into system 300 with user device 352. For example, user device 352 may correspond to user device 222 (FIG. 2)). System 300 may generate for display one or more initial features on user device 352. In some embodiments, the one or more initial features may correspond to default features and/or features that were pre-fetched by system 300 based on a continuous updating of the feature registry (e.g., feature registry 354) and selection process performed by machine learning model 356.

In response to user device 352 accessing system 300 via logging into edge server 358, system 300 determines content and/or features to generate for display on user device 352 at point 304. For example, user device 352 may send a feature registry request to system 300 at point 304. System 300 may receive the feature registry request and use machine learning model 356 to respond to the request. For example, a user may have selected a hyperlink related to obtaining a credit score.

System 300 may transmit a request to feature customization component 362 to determine content and/or a feature that is best suited for responding to the request at point 306. In response, system 300 may receive a response from feature customization component 362 indicating the content and/or feature that is best suited for responding to the request at point 308. For example, the response at point 312 may indicate that two credit score application features are available. System 300 may additionally provide feedback at point 326, indicating the preference, use, and/or other information that may further refine the criteria used at feature customization component 362 to determine content and/or a feature that is best suited for responding to the request at point 306.

Additionally or alternatively, or in series or in parallel, system 300 may query feature availability component 360 at point 312. For example, feature availability component 360 may indicate the status of one or more features (e.g., whether or not a feature is currently down or otherwise unavailable). Additionally or alternatively, system 300 may determine what features a user of user device 352 may currently access. For example, system 300 may support a tiered feature scheme and/or a subscription service. System 300 may determine the level of access and/or subscription available to the user of user device 352. For example, system 300 may transmit a request for a listing of feature status as well as information about the user at point 310. System may then receive a response at point 312. For example, system 300 may receive a response that the first credit score application feature is not available (e.g., due to maintenance and/or a user not being authorized).

System 300 may then query feature registry 354 for features that are both available (e.g., based on a response from feature availability component 360) and correspond to the response from the feature customization component 362 at point 314. System 300 may then receive a response to the query at point 316. For example, system 300 may receive a response featuring the second credit score application feature, a link to the second credit score application, and/or a location in memory of the second credit score application feature.

At point 318, system 300 may then transmit a response to the feature registry request received at point 304 that includes the second credit score application feature, a link to the second credit score application, and/or a location in memory of the second credit score application feature. For example, system 300 may transmit an instruction to user device 352 to generate for display the second credit score application feature.

At point 320, user device 352 may generate for display the second credit score application feature. Furthermore, while the second credit score application feature is generated for display, system 300 (e.g., machine learning model 356) may continue to monitor the user and the availability of the second credit score application feature. For example, system 300 may continuously query feature availability component 360, feature customization component 362, and/or feature registry 354 in real-time or according to a predetermined schedule in order to detect changes (e.g., in the availability of a feature, the feature with the highest customization level, etc.). In response to detecting a change, system 300 may push an update to user device 352.

Figure 4:
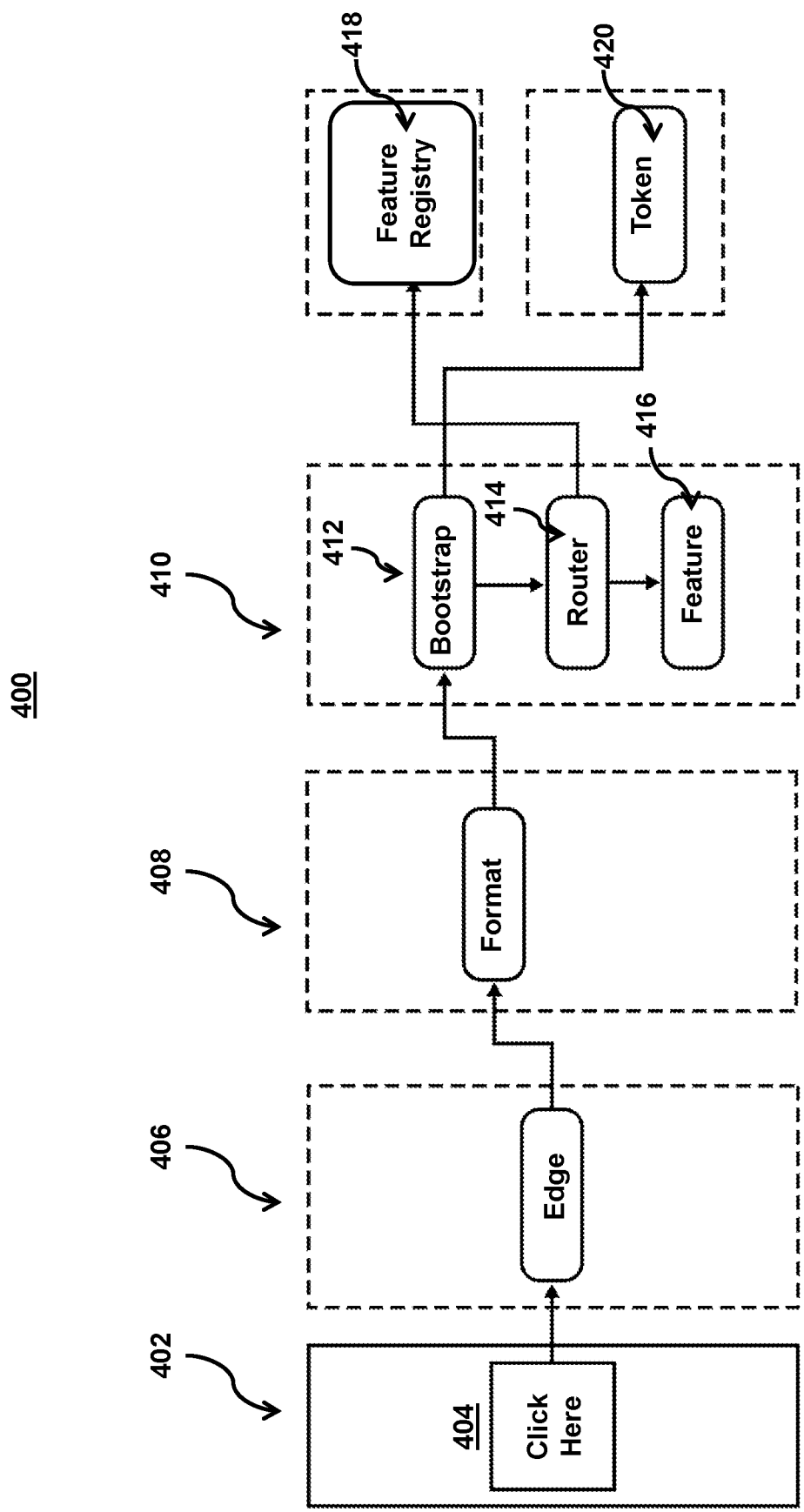
FIG. 4 shows an illustrative system diagram of the architecture of a universal deep linking system with a feature registry, in accordance with one or more embodiments.

FIG. 4 shows an illustrative system diagram of the architecture of a universal deep linking system with a feature registry, in accordance with one or more embodiments. For example, through the use of universal deep linking, the system is able to route users to an appropriate feature irrespective of whether the user is acting through a web application, mobile application, native application, etc. Notably, the universal deep linking provides a dynamic route for linking features to a user as opposed to a fixed hard coded path, which simplifies interfacing/routing of users. Additionally, FIG. 4 shows an environment in which identity of a user may be authenticated prior to a feature registry request being transmitted to the feature registry.

For example, diagram 400 shows user interface 402. User interface may include a first universal deep link (e.g., universal deep link 404). For example, universal deep link 404 may be based on a deep link application programming interface ("API"). In such cases, internal or external content providers (e.g., user wishing to place a deep link on their website, in their application, etc.) may create a universal deep link based on the deep link API (e.g., as described further in relation to FIG. 4 below). The internal or external content provider may determine information about the deep link such as the text, look, and/or other graphical elements of a hyperlink of the universal deep link. Additionally or alternatively, the content providers may determine how dynamic the deep link is and to the extant which a feature registry may select a feature in response to a user selection of the universal deep link. For example, the content provider may designate the universe of features that may be selected as well as what content or features may or may not be presented. Additionally or alternatively, the content providers may assign weights and biases that may be interpreted by a feature registry when a feature registry request is received from the deep link.

For example, a content provider may specify what information may be used as criteria for a dynamic selection of a feature as well as how important any user information (or other information) is to the customization/selection process. For example, the content provider may designate that a given hyperlink may only redirect a user to one of three feature types and only features that are provided by the content provider. Additionally or alternatively, the content provider may specify that only age information about the user is relevant to the selection process. These criteria and specifications may then be used to generate the universal deep link.

These criteria and specifications are then transmitted to the feature registry (e.g., system 300 (FIG. 3)) for use in selecting a feature. The feature registry (or one or more component of the feature registry (e.g., machine learning model 356 (FIG. 3)) may then interpret the feature registry request as well as the criteria and specifications.

Upon a user selection of universal deep link 404, a feature registry request generated and redirected to edge server 406. For example, edge server 406 may provide an entry point into a network for the system. In some embodiments, edge server 406 may be located inside Internet exchange points (IxPs) to allow different networks to connect and share transit. Edge server 406 then redirects the feature registry request to system 408. For example, system 408 may, in some embodiments, correspond to one or more components of system 300 (FIG. 3).

System 408 may then select a format of the feature registry request (e.g., whether the feature registry request was received from a web application, a mobile application, native application, etc.). Based on this determination, system 408 may redirect the request to the appropriate feature registry format. For example, in response to determining that the appropriate feature registry format is a web format, system 408 may select a location (e.g., location 410) in memory at which a web application format of the feature registry is stored.

At location 410, the feature registry may initialize bootstrap program 412 and either contact an application router 414 or access tokenization component 420. For example, the bootstrap program may be the first code that is executed by the feature registry when the feature registry is accessed. as it loads the operating system of the feature registry and/or system 408. Without bootstrapping, system 408 and/or the feature registry would have to download all the software components, including the ones not frequently required. With bootstrapping, only those software components need to be downloaded that are legitimately required and all extraneous components are not required. This process frees up space in the memory and consequently saves time and allows system 408 to respond to feature registry requests faster.

Application router 414 may select a feature 416. For example, if a receive feature registry request does not include a request for a customized response, system 408 may respond with a default feature (e.g., feature 416) as requested by the feature registry request. In some embodiments, application router 414 may transmit information to feature registry 418 to select a customized feature. Application router 414 may be called by system 408 to select a SIP Servlet application to service an initial request. For example, the application router 414 selects which applications to invoke. Notably, by having the bootstrapping process and detokenization prior to the application select by the application router 414, system 408 ensures that only authenticated users are sent to feature registry 418.

If tokenization (or detokenization) was required by system 408, system 408 may access tokenization component 420. For example, tokenization is the process of replacing sensitive data with unique identification symbols that retain all the essential information about the data without compromising its security. For example, payment card industry ("PCI") standards do not allow credit card numbers to be stored on a retailer's point-of-sale ("POS") terminal (e.g., a third-party application provider) or in its databases after a transaction. To be PCI compliant, third-party application provider may need to provide expensive end-to-end encryption systems or outsource their payment processing to a service provider who provides a "tokenization option." The service provider handles the issuance of the token value and bears the responsibility for keeping the cardholder data locked down. By providing an internal tokenization component 420, the system provides a more seamless and secure environment, while alleviating the need for an additional service provider. Moreover, by authenticating an identity of a user of the local device; in response to authenticating the identity of the user prior to retrieving a user profile associated with the user (or otherwise accessing feature registry 418), the system likewise provides a more secure environment.

For example, the system may issue a third-party application provider a driver for the POS system that converts credit card numbers into randomly generated values (i.e., "tokens"). The token is not a primary account number ("PAN"); therefore, it cannot be used outside the context of a specific unique transaction with that particular third-party application provider. For example, in a credit card transaction, the token may contain only the last four digits of the actual card number, while the rest of the token consists of alphanumeric characters that represent cardholder information and data specific to the transaction underway. The tokenization component 420 may detokenize this information after it is provided by the third-party application, but before this information (or user profile information based on this information) is transmitted to feature registry 418.

In some embodiments, the system may also provide token-based authentication, either internally (e.g., between system components) or externally (e.g., between a thirty-party application and the feature registry). For example, the system may allow users (e.g., via a third-party application) to enter their username and password in order to obtain a token which allows them to fetch a specific resource— without using their username and password. Once their token has been obtained, the user can offer the token—which offers access to a specific resource (e.g., the feature registry) for a time period.

Figure 5:
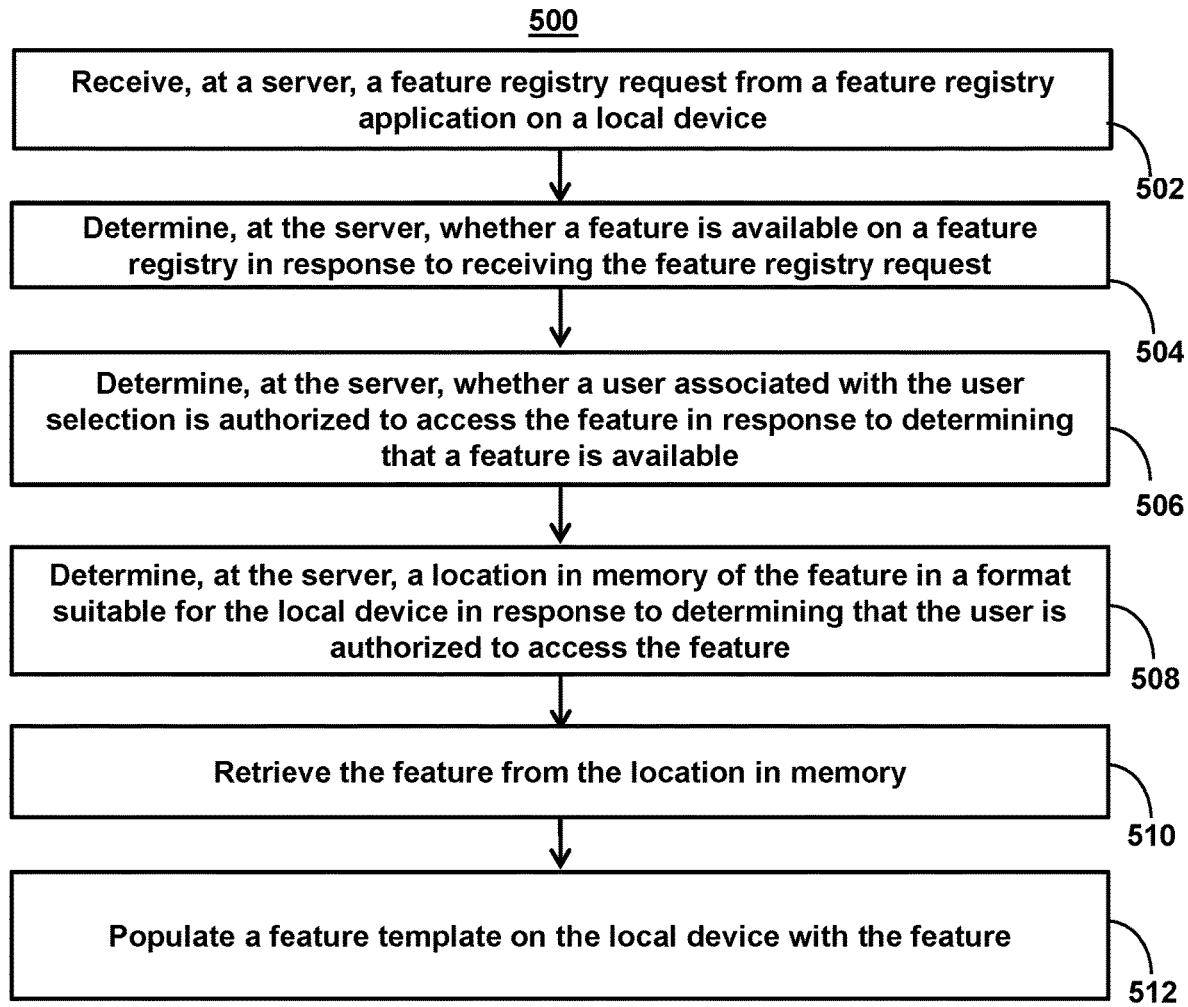
FIG. 5 shows a flowchart of the steps performed by a feature registry in populating a feature template on a local device, in accordance with one or more embodiments.

FIG. 5 shows a flowchart of the steps performed by a feature registry in populating a feature template on a local device, in accordance with one or more embodiments. For example, process 500 may represent the steps taken by one or more devices as shown in FIGS. 1-4. For example, process 500 may be performed by a software development version control system that includes cloud-based memory configured to store a plurality of stories of a first project and cloud-based control and I/O circuitry.

At step 502, process 500 receives (e.g., using server 108 (FIG. 1) and/or control circuitry of one or more components of system 200 (FIG. 2)) a feature registry request from a feature registry application on a local device. For example, the feature registry request may be generated by the local device in response to a user selection of hyperlinked content associated with the feature registry application. For example, as discussed in FIG. 4 above, the hyperlinked content may be provided in a third-party application.

At step 504, process 500 determines (e.g., using server 108 (FIG. 1) and/or control circuitry of one or more components of system 200 (FIG. 2)) whether a feature is available on a feature registry in response to receiving the feature registry request. For example, the system may further comprise selecting the feature from available features on the feature registry (e.g., feature registry 418 (FIG. 4).

At step 506, process 500 determines (e.g., using server 108 (FIG. 1) and/or control circuitry of one or more components of system 200 (FIG. 2)) whether a user associated with the user selection is authorized to access the feature in response to determining that a feature is available. For example, in some embodiments, the system determines whether the user associated with the user selection is authorized to access the feature may further comprise determine an identity of the user associated with the user selection and determine a user account of the feature registry associated with the identity. For example, in some embodiments, authorizing the user may include one or more step involved in authenticating a user as described in FIG. 4.

In some embodiments, the system may determine an identity of a user associated with the user selection. The system may then determine information in a user profile associated with the user and/or determine a description of hyperlink content. The system may then select the feature based on the identity of the user, the information from the user profile, and the description of the hyperlink content. For example, the system may select a feature that is both relevant to the user (e.g., a bank account of the user) and the hyperlinked content (e.g., an account feature corresponding to the hyperlinked content) that was selected.

At step 508, process 500 determines (e.g., using server 108 (FIG. 1) and/or control circuitry of one or more components of system 200 (FIG. 2)) a location in memory of the feature in a format suitable for the local device in response to determining that the user is authorized to access the feature. For example, the system may determine the location of the feature in a format suitable for the local device by determining an operating system of the local device and selecting the feature based on the operating system.

At step 510, process 500 retrieves (e.g., using server 108 (FIG. 1) and/or control circuitry of one or more components of system 200 (FIG. 2)) the feature from the location in memory. For example, the location may be in a system component (e.g., a component of system 300 (FIG. 3)) that is remote from the feature registry and/or a local device.

At step 512, process 500 populates (e.g., using server 108 (FIG. 1) and/or control circuitry of one or more components of system 200 (FIG. 2)) a feature template on the local device with the feature. In some embodiments, the feature template may include a plurality of feature cells, and the system may populate the feature template on the local device with the feature by selecting one of the plurality of feature cells for populating the feature. For example, a local device may display features by populating a feature template that is shown in a user interface on the local device.

In some embodiments, the system may select the one of the plurality of feature cells for populating with the feature based on information in a user profile of a user associated with the user selection. For example, the feature may be customized to a particular user (e.g., as described in FIG. 6 below) such as retrieving a feature that include information (e.g., a name, bank account number, etc.) corresponding to a user. In another example, the feature may be customized for the user based on an identity of the user, information from a user profile of the user, and a description of the hyperlinked content (e.g., as described in FIG. 6 below).

In some embodiments, the system may select one of the plurality of feature cells for populating with the feature based on a location of the hyperlinked content in a display screen of the local device. For example, if the user the hyperlinked content was in an upper-right region of the display screen on the local device, the system may determine a feature cell that corresponds to the upper-right region. The system may then select the feature cell that corresponds to the upper-right region for populating the selected feature cell.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

Figure 6:
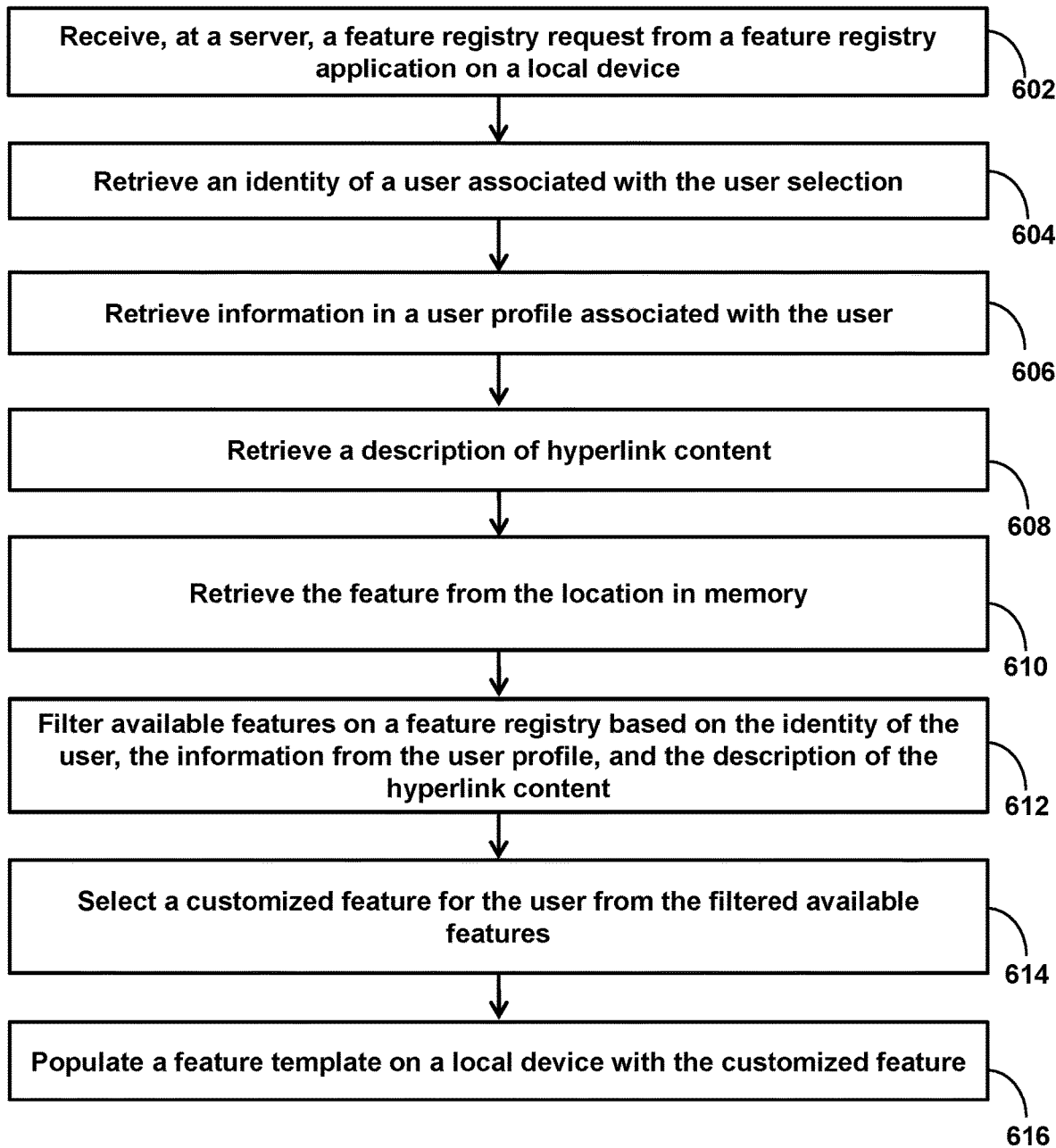
FIG. 6 shows a flowchart of the steps involved in providing customized features using a feature registry, in accordance with one or more embodiments.

FIG. 6 shows a flowchart of the steps involved in providing customized features using a feature registry, in accordance with one or more embodiments. For example, process 600 may represent the steps taken by one or more devices as shown in FIGS. 1-4. For example, process 600 may be performed by a software development version control system that includes cloud-based memory configured to store a plurality of stories of a first project and cloud-based control and I/O circuitry.

At step 602, process 600 receives (e.g., using server 108 (FIG. 1) and/or control circuitry of one or more components of system 200 (FIG. 2)) a feature registry request from a feature registry application on a local device, wherein the feature registry request is generated by the local device in response to a user selection of hyperlinked content associated with the feature registry application. The system may then perform one or more steps in response to receiving the feature registry request.

In some embodiments, process 600 may initiate, at the server, a user interface application. The system may then generate for display the hyperlinked content in the user interface application. The system may then pre-fetch an initial feature based on the identity of the user. For example, in order to improve response time and overall user experience, the system may pre-fetch features that the user is likely to use.

At step 604, process 600 retrieves (e.g., using server 108 (FIG. 1) and/or control circuitry of one or more components of system 200 (FIG. 2)) an identity of a user associated with the user selection. In some embodiments, the system may further authenticate the user (e.g., as described in FIG. 4 above). For example, the system may authenticate the identity of the user prior to receiving the feature registry request. In such cases, authenticating the identity of the user may comprise determining a user account of the feature registry associated with the identity.

At step 606, process 600 retrieves (e.g., using server 108 (FIG. 1) and/or control circuitry of one or more components of system 200 (FIG. 2)) information in a user profile associated with the user. In some embodiments, a user profile associated with the user may be stored and/or accessible by a local device. The system may supplement this user profile with additional information once the feature registry request is received at the feature registry (e.g., via a server 108 (FIG. 1)).

At step 608, process 600 retrieves (e.g., using server 108 (FIG. 1) and/or control circuitry of one or more components of system 200 (FIG. 2)) a description of hyperlink content. For example, the description of the hyperlink may include a feature reference provided by a third-party application.

At step 610, process 600 retrieves (e.g., using server 108 (FIG. 1) and/or control circuitry of one or more components of system 200 (FIG. 2)) the feature from the location in memory. For example, as described in FIG. 4 above, the system may provide different formats of feature that may or may not be available. The system may locate and retrieve available features.

At step 612, process 600 filters (e.g., using server 108 (FIG. 1) and/or control circuitry of one or more components of system 200 (FIG. 2)) available features on a feature registry based on the identity of the user, the information from the user profile, and the description of the hyperlink content.

At step 614, process 600 selects (e.g., using server 108 (FIG. 1) and/or control circuitry of one or more components of system 200 (FIG. 2)) a customized feature for the user from the filtered available features. In some embodiments, the customized feature may be selected based on one or more criteria. For example, the selection of the customized feature for the user may be further based on other customized features already populated in the feature template. For example, if the system has selected a first customized feature, the system may select a second customized feature based on the second feature complimenting and/or not being redundant to the first feature. Additionally or alternatively, the selection may be further based on information in a user profile. For example, the user profile (or user information in the user profile) may provide additional criteria for the customized feature (e.g., the user profile may indicate that the user prefers a first feature over a second feature).

In some embodiments, the feature template may include a plurality of feature cells. The system may select one of the plurality of feature cells for populating with the customized feature based on the information in the user profile. For example, the user profile may indicate that the user prefers a first feature cell for a given feature over a second feature cell for the given feature (or features in general). Additionally or alternatively, the system may select a feature cell based on the location of the hyperlinked content in a display screen of the local device. For example, if the hyperlinked content was in an upper-right region of the display screen on the local device, the system may determine a feature cell that corresponds to the upper-right region. The system may then select the feature cell that corresponds to the upper-right region for populating the selected feature cell.

Additionally or alternatively, the system may select the customized feature based on the local device type and/or operating system of the local device. For example, the system may determine an operating system of the local device and select the customized feature based on it being compatible with the operating system. In another example, the system may determine that the local device has a small display screen (or a display screen of a particular resolution and/or pixel number), the system may then select the feature that corresponds to that attribute. Additionally or alternatively, the system may determine a location in memory of the customized feature in a format suitable for the local device; and retrieve the customized feature from the location in memory.

At step 616, process 600 populates (e.g., using server 108 (FIG. 1) and/or control circuitry of one or more components of system 200 (FIG. 2)) a feature template on a local device with the customized feature. In some embodiments, the customized feature may comprise a multichannel notification. For example, the customized feature may provide notifications in a plurality of messaging formats (e.g., are email, mobile push notifications, SMS (text messages), and in-app messages).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 6.

Figure 7:
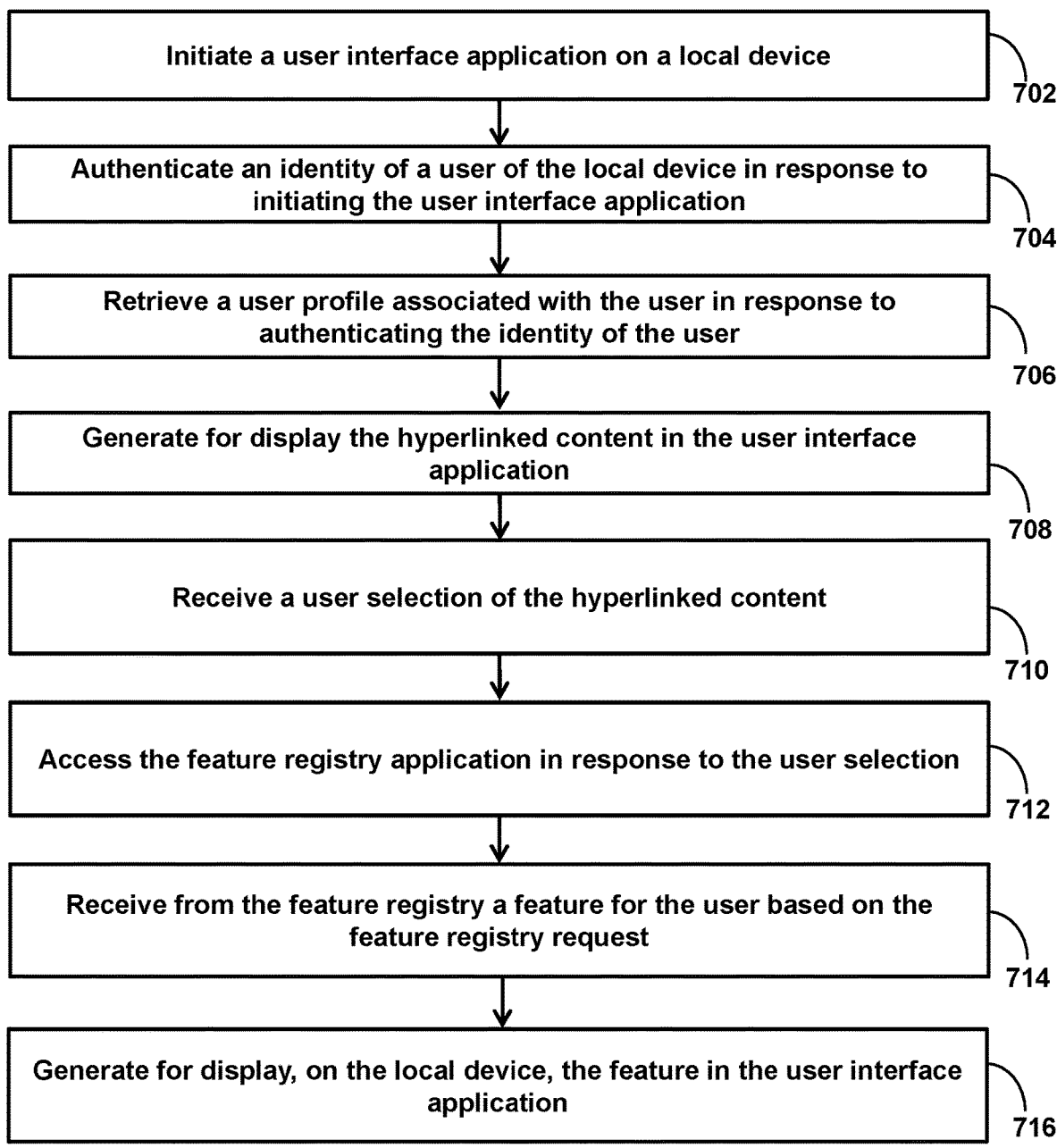
FIG. 7 shows a flowchart of the steps involved authenticating a user accessing a feature registry, in accordance with one or more embodiments.

FIG. 7 shows a flowchart of the steps involved authenticating a user accessing a feature registry, in accordance with one or more embodiments. For example, process 700 may represent the steps taken by one or more devices as shown in FIGS. 1-4. For example, process 700 may be performed by a software development version control system that includes cloud-based memory configured to store a plurality of stories of a first project and cloud-based control and I/O circuitry.

At step 702, process 700 initiates (e.g., using server 108 (FIG. 1) and/or control circuitry of one or more components of system 200 (FIG. 2)) a user interface application on a local device. For example, a user of a local device (e.g., user device 222 (FIG. 2)) may open a native application on the local device, access a website using a web browser, or sign into an application.

At step 704, process 700 authenticates (e.g., using server 108 (FIG. 1) and/or control circuitry of one or more components of system 200 (FIG. 2)) an identity of a user of the local device. For example, the system may authenticate the identity in response to initiating the user interface application. In some embodiments, authenticating the identity of the user comprises determining a user account of the feature registry associated with the user. For example, the feature registry may store user accounts and the feature registry application may either determine and/or transmit information used (e.g., by the feature registry) to determine which user account corresponds to the user. In some embodiments, the authentication of the user may comprise detokenization (e.g., as described in FIG. 4 above).

Additionally or alternatively, the identity of the user is authenticated (e.g., by the feature registry application and/or the feature registry) prior to generating for display the hyperlinked content on the local device. For example, the system may pre-fetch user data and/or information from a native application in order to authenticate the identity of the user. By doing so, the system may display more relevant and/or private data immediately upon loading the feature registry application.

At step 706, process 700 retrieves (e.g., using server 108 (FIG. 1) and/or control circuitry of one or more components of system 200 (FIG. 2)) a user profile associated with the user. For example, in response to authenticating the identity of the user, the system may retrieve a user profile associated with the user from local or remote storage.

At step 708, process 700 generates for display (e.g., using server 108 (FIG. 1) and/or control circuitry of one or more components of system 200 (FIG. 2)) the hyperlinked content in the user interface application. For example, the hyperlinked content may be associated with a feature registry application.

At step 710, process 700 receives (e.g., using server 108 (FIG. 1) and/or control circuitry of one or more components of system 200 (FIG. 2)) a user selection of the hyperlinked content. For example, a user may select, hover over, and/or otherwise identify a desire to follow the hyperlink.

At step 712, process 700 accesses (e.g., using server 108 (FIG. 1) and/or control circuitry of one or more components of system 200 (FIG. 2)) the feature registry application. For example, in response to the user selection, the system may access the feature registry application. In some embodiments, the feature registry application may transmit a feature registry request to a feature registry, and the feature registry request may include the identity of the user, information from the user profile, and a description of the hyperlinked content. For example, the feature registry application may transmit information to the feature registry for use in selecting a feature from a plurality of available features for use in populating a feature template on a local device.

For example, the feature registry request may be generated to include the identity of the user, the information from the user profile, and the description of the hyperlinked content. In such embodiments, this information may be generated by the feature registry application and transmitted to the feature registry. For example, the feature registry may act as a thick client serving the thin client of the feature registry application. The feature registry may then use more robust processing power to find and select a feature that is suitable for the request.

In some embodiments, the description of the hyperlinked content is formatted for the feature registry. For example, the description may describe a particular function associated with the hyperlinked content. In response, the system may identify a feature that serves the particular function. Additionally or alternatively, the system may select a particular function based on the user. For example, the feature registry application may transmit information from the user profile. This information may include recent purchases, user preferences, and/or other user-specific data used to customize a feature. In some embodiments, this information may be normalized before transmitting to the feature registry. For example, the feature registry application may format user preference data (e.g., received from a third-party source) prior to transmitting the information to the feature registry.

In some embodiments, the feature registry may select the feature based on filtering available features on the feature registry based on the identity of the user, the information from the user profile, and/or the description of the hyperlinked content. For example, in response to receiving a request for a feature, the system may retrieve all available features. The system may then determine which of the available features meet one or more criteria of the request such as the requested function, user, etc. The system may then select a feature by filtering the available features by the criteria.

In some embodiments, the feature registry may further determine that the feature is available in a format suitable for the local device. For example, the system may determine an operating system of the local device. The system may then select the feature based on filtering available features based on the operating system. For example, if the local device runs on an Android operating system, but the only available feature that serves the request is based on iOS, the system may not select the feature.

At step 714, process 700 receives (e.g., using server 108 (FIG. 1) and/or control circuitry of one or more components of system 200 (FIG. 2)) from the feature registry a feature for the user based on the feature registry request. For example, the system may push a download, stream, or send a pointer to a location of the feature.

At step 716, process 700 generates for display (e.g., using server 108 (FIG. 1) and/or control circuitry of one or more components of system 200 (FIG. 2)) the feature in the user interface application. For example, the feature may be populated in a feature template on the local device. In some embodiments, the feature may comprise a multichannel notification. For example, the customized feature may provide notifications in a plurality of messaging formats (e.g., are email, mobile push notifications, SMS (text messages), and in-app messages). Accordingly, the system may ensure that the local device and/or feature registry application is capable of handling the various notification types.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 7.

Figure 8:
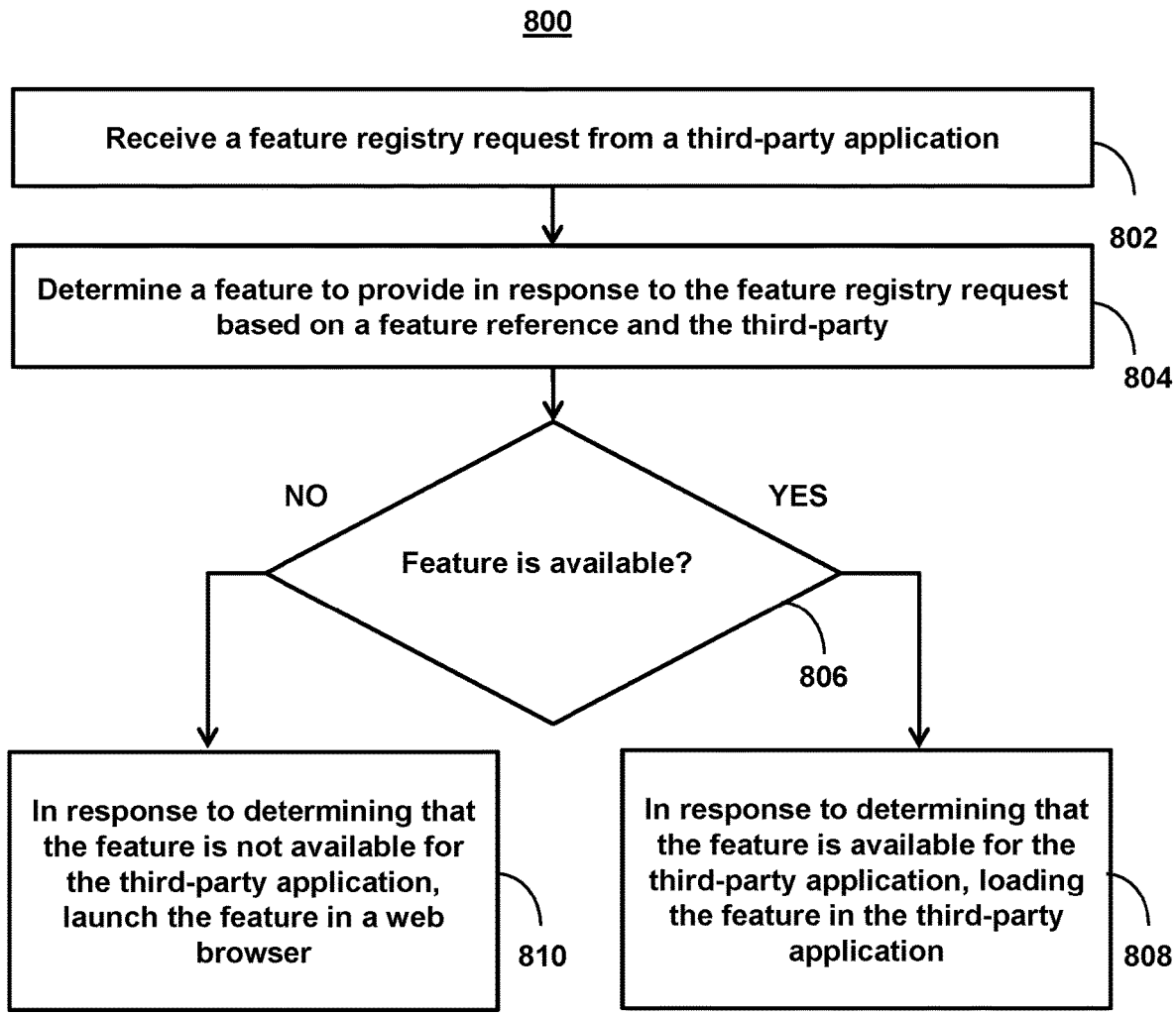
FIG. 8 shows a flowchart of the steps involved in determining whether to load a feature in a third-party application, in accordance with one or more embodiments.

FIG. 8 shows a flowchart of the steps involved in determining whether to load a feature in a third-party application, in accordance with one or more embodiments. For example, process 800 may represent the steps taken by one or more devices as shown in FIGS. 1-4. For example, process 800 may be performed by a software development version control system that includes cloud-based memory configured to store a plurality of stories of a first project and cloud-based control and I/O circuitry. In some embodiments, process 800 may be used by content provider to push user from web application to native application provider by the content provider.

At step 802, process 800 receives (e.g., using server 108 (FIG. 1) and/or control circuitry of one or more components of system 200 (FIG. 2)) a feature registry request from a third-party application on a local device. For example, the system may receive, at a sever, a feature registry request from a third-party application (e.g., user device 222 (FIG. 2)). For example, the system may be configured to work with a third-party mobile application by, upon a user accessing a universal deep link specifying a feature reference, the system dynamically selects a corresponding feature (e.g., if available).

At step 804, process 800 determines (e.g., using server 108 (FIG. 1) and/or control circuitry of one or more components of system 200 (FIG. 2)) a feature to provide in response to the feature registry request based on a feature reference and the third-party. For example, a universal deep link may include a feature reference (e.g., as described above) that indicates the purpose, functions, origin, system requirements (including required formats and/or capabilities), author, recommended use and/or user, related features (including features designated as complimentary, redundant, and/or incompatible). The system may determine which specific feature to provide a user (based on the feature reference associated with a link) based on (i) the feature reference, (ii) the third-party provider of the application, and (iii) other criteria (e.g., the user, operating system, device type, etc.).

At step 806, process 800 determines (e.g., using server 108 (FIG. 1) and/or control circuitry of one or more components of system 200 (FIG. 2)) whether the feature is available for the third-party application. For example, in response to identifying a feature for use in responding to the request, the system may determine whether or not the feature is available (e.g., by querying feature availability component 360 (FIG. 3)).

At step 808, process 800 loads (e.g., using server 108 (FIG. 1) and/or control circuitry of one or more components of system 200 (FIG. 2)) the feature in the third-party application in response to determining that the feature is available for the third-party application. For example, in response to a specific feature existing for the third-party application and feature registry request, the system causes the application to load the specific feature within the application (e.g., by providing the application with a specific link to a mobile page having the specific feature.

At step 810, process 800 launches (e.g., using server 108 (FIG. 1) and/or control circuitry of one or more components of system 200 (FIG. 2)) the feature in a web browser in response to determining that the feature is not available for the third-party application. For example, in response to a specific feature not existing for the third-party application and feature registry request, the system may cause the application to launch a separate browser application to load an alternative web channel associated with the feature reference.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 8.

Figure 9:
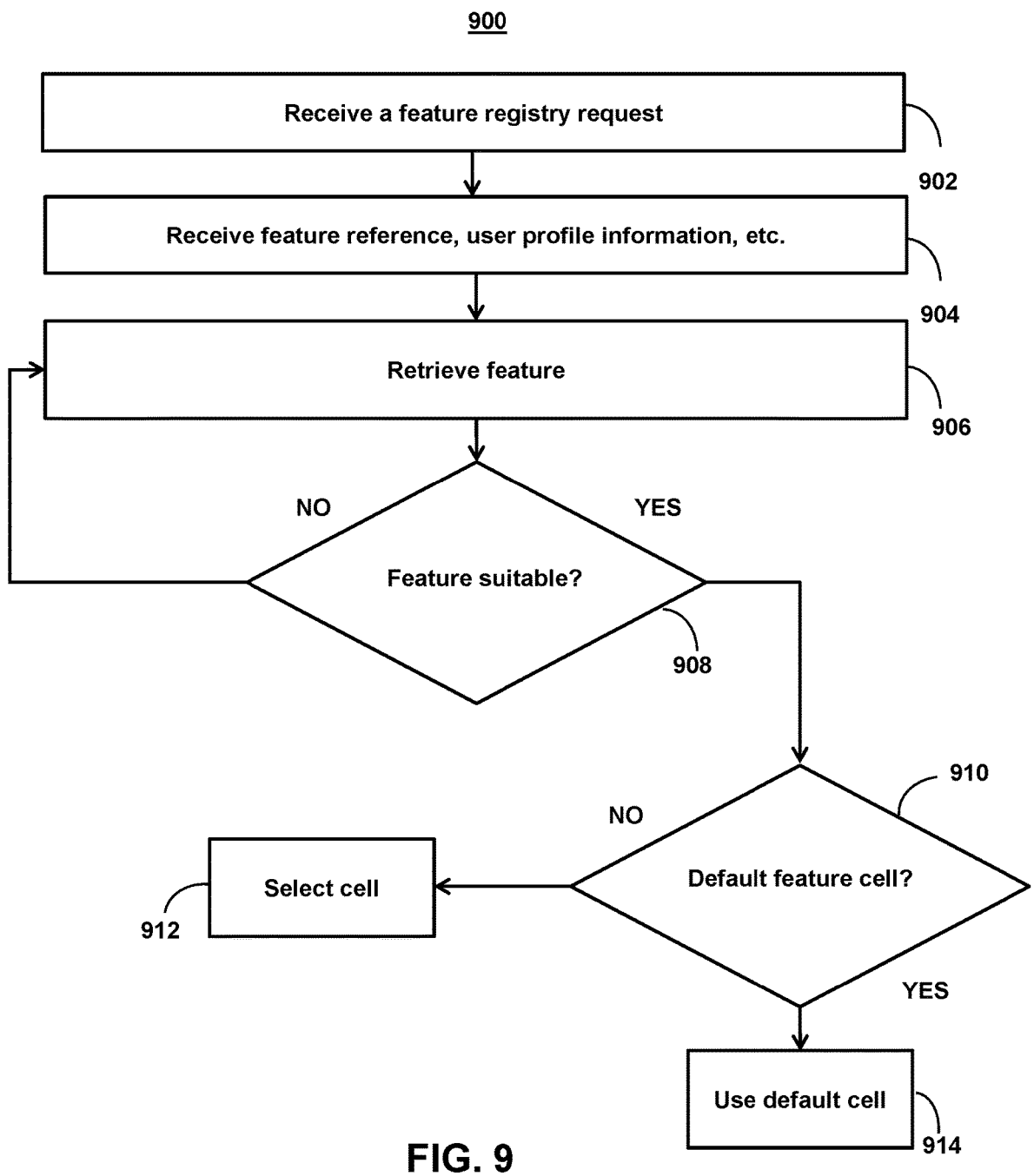
FIG. 9 shows a flowchart of the steps involved in determining a feature cell for a feature, in accordance with one or more embodiments.

FIG. 9 shows a flowchart of the steps involved in determining a feature cell for a feature, in accordance with one or more embodiments. For example, process 900 may represent the steps taken by one or more devices as shown in FIGS. 1-4. For example, process 900 may be performed by a software development version control system that includes cloud-based memory configured to store a plurality of stories of a first project and cloud-based control and I/O circuitry. In some embodiments, process 900 may be used by content provider to push user from web application to native application provider by the content provider.

At step 902, process 900 receives (e.g., using server 108 (FIG. 1) and/or control circuitry of one or more components of system 200 (FIG. 2)) a feature registry request. For example, the system may receive the feature registry request in response to a use selecting a universal deep link.

At step 904, process 900 receives (e.g., using server 108 (FIG. 1) and/or control circuitry of one or more components of system 200 (FIG. 2)) the feature reference, user profile information, etc. For example, the feature reference, user profile information, etc. may be based on information provided by a third-party (e.g., a provider of the application) and/or a user that selected that link.

At step 906, process 900 retrieves (e.g., using server 108 (FIG. 1) and/or control circuitry of one or more components of system 200 (FIG. 2)) feature reference, user profile information, etc. For example, in addition to the feature registry request, the system may receive other information along with or in supplement to the feature registry request.

At step 908, process 900 determines (e.g., using server 108 (FIG. 1) and/or control circuitry of one or more components of system 200 (FIG. 2)) whether or not the feature is suitable. For example, the system may determine whether or not an available feature (e.g., a feature available in feature registry 354 (FIG. 3)) corresponds to the feature reference, user profile information, etc. If the system determines that the feature does not correspond to the feature reference, user profile information, etc., the system returns to step 906 and retrieves another feature. If the system determines that the feature does correspond to the feature reference, user profile information, etc., the system proceeds to step 910.

At step 910, process 900 determines (e.g., using server 108 (FIG. 1) and/or control circuitry of one or more components of system 200 (FIG. 2)) whether or not to generate for display the feature in a default feature cell. If so, the system proceeds to step 914 and generates for display the feature in a default cell. For example, the default cell may be statically assigned by the application and/or may correspond to the next available cell.

In contrast, if the system determines not to place the feature in a default feature cell, the system may dynamically select a cell at step 912. For example, in some embodiments, a user interface may comprise a feature template that may include a plurality of feature cells, and the system may populate the feature template on the local device with the feature by selecting one of the plurality of feature cells for populating the feature. For example, a local device may display features by populating a feature template that is shown in a user interface on the local device. In some embodiments, the feature may be customized to a particular user such as retrieving a feature that includes information (e.g., a name, bank account number, etc.) corresponding to a user. In another example, the feature may be customized for the user based on an identity of the user, information from a user profile of the user, and a description of the hyperlinked content. In some embodiments, the system may select one of the plurality of feature cells for populating with the feature based on a location of the hyperlinked content in a display screen of the local device. For example, if the user the hyperlinked content was in an upper-right region of the display screen on the local device, the system may determine a feature cell that corresponds to the upper-right region. The system may then select the feature cell that corresponds to the upper-right region for populating the selected feature cell.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of generating customized content on a website or mobile application through a hyperlink, the method comprising: receiving, at a server, a feature registry request from a feature registry application on a local device, wherein the feature registry request is generated by the local device in response to a user selection of hyperlinked content associated with the feature registry application; in response to receiving the feature registry request, determining, at the server, whether a feature is available on a feature registry; in response to determining that a feature is available, determining, at the server, whether a user associated with the user selection is authorized to access the feature; in response to determining that the user is authorized to access the feature, determining, at the server, a location in memory of the feature in a format suitable for the local device; retrieving the feature from the location in memory; and populating a feature template on the local device with the feature.

2. The method of embodiment 1, further comprising selecting the feature from available features on the feature registry or selecting the feature based on a machine learning model.

3. The method of embodiment 1 or 2, further comprising: determining an identity of a user associated with the user selection; determining information in a user profile associated with the user; determining a description of hyperlink content; and selecting the feature based on the identity of the user, the information from the user profile, and the description of the hyperlink content.

4. The method of any one of embodiments 1-3, wherein determining whether the user associated with the user selection is authorized to access the feature further comprises: determining an identity of the user associated with the user selection; and determining a user account of the feature registry associated with the identity.

5. The method of any one of embodiments 1-4, wherein determining the location of the feature in a format suitable for the local device comprises: determining an operating system of the local device; and selecting the feature based on the operating system.

6. The method of any one of embodiments 1-5, wherein the feature template includes a plurality of feature cells, and wherein populating the feature template on the local device with the feature comprises selecting one of the plurality of feature cells for populating the feature.

7. The method of embodiment 6, further comprising selecting the one of the plurality of feature cells for populating with the feature based on information in a user profile of a user associated with the user selection.

8. The method of embodiment 6, further comprising selecting one of the plurality of feature cells for populating with the feature based on a location of the hyperlinked content in a display screen of the local device.

9. The method of any one of embodiments 1-8, wherein the feature is customized for the user based on an identity of the user, information from a user profile of the user, and a description of the hyperlinked content.

10. A method of generating customized content on a website or mobile application through a hyperlink, the method comprising: receiving, at a server, a feature registry request from a feature registry application on a local device, wherein the feature registry request is generated by the local device in response to a user selection of hyperlinked content associated with the feature registry application; in response to receiving the feature registry request: retrieving an identity of a user associated with the user selection; retrieving information in a user profile associated with the user; and retrieving a description of hyperlink content; filtering available features on a feature registry based on the identity of the user, the information from the user profile, and the description of the hyperlink content; selecting a customized feature for the user from the filtered available features; and populating a feature template on a local device with the customized feature.

11. The method of embodiment 10, further comprising authenticating the identity of the user prior to receiving the feature registry request or selecting the customized feature based on a machine learning model.

12. The method of embodiment 11, wherein authenticating the identity of the user comprises determining a user account of the feature registry associated with the identity.

13. The method of any one of embodiments 10-12, further comprising: initiating, at the server, a user interface application; generating for display the hyperlinked content in the user interface application; and pre-fetching an initial feature based on the identity of the user.

14. The method of any one of embodiments 10-13, wherein the selection of the customized feature for the user is further based on other customized features already populated in the feature template.

15. The method of any one of embodiments 10-14, wherein the feature template includes a plurality of feature cells, and wherein the method further comprises selecting one of the plurality of feature cells for populating with the customized feature based on the information in the user profile.

16. The method of any one of embodiments 10-15, further wherein the feature template includes a plurality of feature cells, and wherein the method further comprises feature based on a location of the hyperlinked content in a display screen of the local device.

17. The method of any one of embodiments 10-16, further comprising determining an operating system of the local device, and wherein the selection of the customized feature for the user is further based on the operating system.

18. The method of any one of embodiments 10-17, wherein the customized feature comprises multichannel notifications.

19. The method of any one of embodiments 10-18, further comprising: determining a location in memory of the customized feature in a format suitable for the local device; and retrieving the customized feature from the location in memory.

20. A method of hyperlinking user-specific content on a website or mobile application, the method comprising: initiating, using control circuitry, a user interface application on a local device; in response to initiating the user interface application, authenticating, using the control circuitry, an identity of a user of the local device; in response to authenticating the identity of the user, retrieving, using the control circuitry, a user profile associated with the user; generating for display, using the control circuitry, the hyperlinked content in the user interface application, wherein the hyperlinked content is associated with a feature registry application; receiving, using the control circuitry, a user selection of the hyperlinked content; in response to the user selection, accessing, using the control circuitry, the feature registry application, wherein the feature registry application transmits a feature registry request to a feature registry, and wherein the feature registry request includes the identity of the user, information from the user profile, and a description of the hyperlinked content; receiving from the feature registry a feature for the user based on the feature registry request; and generating for display, on the local device, the feature in the user interface application.

21. The method of embodiment 20, wherein the description of the hyperlinked content is formatted for the feature registry.

22. The method of embodiment 20 or 21, wherein the information from the user profile is normalized for the feature registry.

23. The method of any one of embodiments 20-22, wherein authenticating the identity of the user comprises determining a user account of the feature registry associated with the user.

24. The method any one of embodiments 20-23, wherein the identity of the user is authenticated prior to generating for display the hyperlinked content on the local device.

25. The method any one of embodiments 20-24, wherein the feature registry selects the feature based on filtering available features on the feature registry based on the identity of the user, the information from the user profile, and the description of the hyperlinked content.

26. The method any one of embodiments 20-25, further comprising determining an operating system of the local device, wherein the feature registry on the feature registry selects the feature based on filtering available features based on the operating system.

27. The method any one of embodiments 20-26, wherein the feature comprises multichannel notifications.

28. The method any one of embodiments 20-27, wherein the feature is populated in a feature template on the local device.
29. The method any one of embodiments 20-28, wherein the feature registry request is generated to include the identity of the user, the information from the user profile, and the description of the hyperlinked content.
30. The method of any one of embodiments 20-29, wherein the feature is selected based on a machine learning model.
31. A tangible, non-transitory, machine-readable medium storing instructions that, when executed by a data processing apparatus, cause the data processing apparatus to perform operations comprising those of any of embodiments 1-30.
32. A system comprising: one or more processors; and memory storing instructions that, when executed by the processors, cause the processors to effectuate operations comprising those of any of embodiments 1-30.
33. A system comprising means for performing any of embodiments 1-30.

What is claimed is:

1. A system for hyperlinking user-specific content on a website or mobile application, the system comprising:
    memory configured to store:
        a user profile; and
        a feature registry, wherein the feature registry is a centralized catalog for feature providers to register native applications and add or configure features for toggling or throttling in the native applications; and
    control circuitry configured to:
        initiate, on a local device, a user interface application using a web browser;
        authenticate an identity of a user of the local device in response to initiating the user interface application;
        retrieve the user profile associated with the user in response to authenticating the identity of the user;
        generate for display hyperlinked content in the user interface application, wherein the hyperlinked content is associated with a feature registry application;
        receive a user selection of an anchor link of the hyperlinked content, wherein the user selection of the anchor link causes the web browser to load the feature registry application;
        access the feature registry application in response to the user selection, wherein the feature registry application transmits a feature registry request to the feature registry, and wherein the feature registry request includes the identity of the user, information from the user profile, and a description of the hyperlinked content;
        receive from the feature registry a feature for the user based on the feature registry request; and
        generate for display, on the local device, the feature in the user interface application using a native application.

2. A method of hyperlinking user-specific content on a website or mobile application, the method comprising:
    initiating a user interface application on a local device;
    in response to initiating the user interface application, authenticating an identity of a user of the local device;
    in response to authenticating the identity of the user, retrieving a user profile associated with the user;
    generating for display hyperlinked content in the user interface application, wherein the hyperlinked content is associated with a feature registry application, wherein a feature registry is a centralized catalog for feature providers to register native applications and add or configure features for toggling or throttling in the native applications;
    receiving a user selection of the hyperlinked content;
    in response to the user selection, accessing the feature registry application, wherein the feature registry application transmits a feature registry request to a feature registry, and wherein the feature registry request includes the identity of the user, information from the user profile, and a description of the hyperlinked content;
    receiving from the feature registry a feature for the user based on the feature registry request; and
    generating for display, on the local device, the feature in the user interface application.

3. The method of claim 2, wherein the description of the hyperlinked content is formatted for the feature registry.

4. The method of claim 2, wherein the information from the user profile is normalized for the feature registry.

5. The method of claim 2, wherein authenticating the identity of the user comprises determining a user account of the feature registry associated with the user.

6. The method of claim 2, wherein the identity of the user is authenticated prior to generating for display the hyperlinked content on the local device.

7. The method of claim 2, wherein the feature registry selects the feature based on filtering available features on the feature registry based on the identity of the user, the information from the user profile, and the description of the hyperlinked content.

8. The method of claim 2, further comprising determining an operating system of the local device, wherein the feature registry on the feature registry selects the feature based on filtering available features based on the operating system.

9. The method of claim 2, wherein the feature comprises multichannel notifications.

10. The method of claim 2, wherein the feature is populated in a feature template on the local device.

11. The method of claim 2, wherein the feature registry request is generated to include the identity of the user, the information from the user profile, and the description of the hyperlinked content.

12. A non-transitory computer-readable medium comprising instructions that, when executed by one or more processors, cause operations comprising:
    initiating a user interface application on a local device;
    authenticating an identity of a user of the local device in response to initiating the user interface application;
    retrieving a user profile associated with the user in response to authenticating the identity of the user;
    generating for display hyperlinked content on the local device, wherein the hyperlinked content is associated with a feature registry application;
    receiving a user selection of the hyperlinked content;
    accessing the feature registry application in response to the user selection, wherein the feature registry application transmits a feature registry request to a feature registry, wherein the feature registry is a centralized catalog for feature providers to register native applications and add or configure features for toggling or throttling in the native applications, and wherein the feature registry request includes the identity of the user, information from the user profile, and a description of the hyperlinked content;
    receiving from the feature registry a feature for the user based on the feature registry request; and
    generating for display, on the local device, the feature in the user interface application.

13. The non-transitory computer-readable medium of claim 12, wherein the description of the hyperlinked content is formatted for the feature registry.

14. The non-transitory computer-readable medium of claim 12, wherein the information from the user profile is normalized for the feature registry.

15. The non-transitory computer-readable medium of claim 12, wherein authenticating the identity of the user comprises determining a user account of the feature registry associated with the user.

16. The non-transitory computer-readable medium of claim 12, wherein the identity of the user is authenticated prior to generating for display the hyperlinked content on the local device.

17. The non-transitory computer-readable medium of claim 12, wherein the feature registry selects the feature based on filtering available features on the feature registry based on the identity of the user, the information from the user profile, and the description of the hyperlinked content.

18. The non-transitory computer-readable medium of claim 12, further comprising instructions that, when executed by one or more processors, cause operations comprising determining an operating system of the local device, wherein the feature registry on the feature registry selects the feature based on filtering available features based on the operating system.

19. The non-transitory computer-readable medium of claim 12, wherein the feature comprises multichannel notifications.

20. The non-transitory computer-readable medium of claim 12, wherein the feature is populated in a feature template on the local device.

\* \* \* \* \*